US009794011B2

(12) United States Patent
Cepuran et al.

(10) Patent No.: US 9,794,011 B2
(45) Date of Patent: Oct. 17, 2017

(54) ACTIVATING A DIGITAL RADIO BROADCAST RECEIVER IN A VEHICLE

(71) Applicant: GM Global Technology Operations LLC, Detroit, MI (US)

(72) Inventors: Lawrence D. Cepuran, Northville, MI (US); William J. Clifford, Flanders, NJ (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/317,673

(22) Filed: Jun. 27, 2014

(65) Prior Publication Data

US 2015/0381297 A1 Dec. 31, 2015

(51) Int. Cl.

| | |
|---|---|
| ***H04B 1/38*** | (2015.01) |
| ***H04H 40/18*** | (2008.01) |
| ***H04M 3/42*** | (2006.01) |
| ***H04H 60/15*** | (2008.01) |
| ***H04H 60/13*** | (2008.01) |

(52) U.S. Cl.

CPC ............ *H04H 60/15* (2013.01); *H04H 60/13* (2013.01); *H04H 40/18* (2013.01); *H04H 2201/18* (2013.01)

(58) Field of Classification Search

CPC ......... H04M 3/42; H04W 4/06; H04W 12/00; H04W 88/00; H04B 1/38; H04B 1/3822

USPC .................................... 455/414.1, 3.01, 3.02

See application file for complete search history.

(56) References Cited

U.S. PATENT DOCUMENTS

| | | | | |
|---|---|---|---|---|
| 7,266,371 | B1 * | 9/2007 | Amin | H04W 8/265 455/418 |
| 8,054,923 | B2 * | 11/2011 | Minato | H04B 1/082 375/260 |
| 8,538,388 | B2 * | 9/2013 | De Luca | H04W 8/18 370/341 |
| 9,305,162 | B2 * | 4/2016 | Yuen | H04L 63/168 |
| 2011/0213681 | A1 * | 9/2011 | Shahid | G06Q 30/02 705/27.1 |

* cited by examiner

*Primary Examiner* — Blane Jackson

(74) *Attorney, Agent, or Firm* — Christopher DeVries; Reising Ethington P.C.

(57) ABSTRACT

A system and method of controlling a digital radio broadcast receiver in a vehicle includes: detecting an instruction to activate the digital radio broadcast receiver; accessing a software application at the vehicle in response to the instruction; and activating the digital radio broadcast receiver in the vehicle at the direction of the software application.

14 Claims, 4 Drawing Sheets

ACTIVATING A DIGITAL RADIO BROADCAST RECEIVER IN A VEHICLE

TECHNICAL FIELD

The present invention relates to digital radio broadcast (DRB) receivers and, more particularly, to activating a DRB receiver in a vehicle.

BACKGROUND

Modern vehicles often include a wide array of communications and infotainment features. When they leave the factory, vehicles can include a vehicle telematics unit that monitors vehicle functions and also provides communication channels to remotely-located facilities and individuals. In addition, vehicles can include infotainment modules that can, as the name indicates, provide information and entertainment to vehicle occupants in a variety of forms, such as radio broadcasts and navigation services.

Radio broadcasts received by the infotainment modules have evolved from FM or AM analog radio content broadcast via terrestrial antenna to also include digital satellite radio or other digital radio broadcasts. While the terrestrial analog radio broadcasts can be received at the vehicle for no charge, digital radio broadcasts often involve some sort of a payment made to the provider. These payments may be made on a monthly basis or as a licensing fee that is paid in return for activating a digital radio broadcast receiver. Manufacturers of vehicles can provide hardware for each vehicle it assembles to receive digital radio broadcasts. However, vehicle manufacturers may be reluctant to activate that ability for each vehicle and pay an associated licensing fee when a vehicle owner may not use or enjoy the digital radio broadcasts received by the vehicle. Thus, it can be helpful to selectively activate the digital radio broadcast receivers in vehicles.

SUMMARY

According to an embodiment of the invention, there is provided a method of controlling a digital radio broadcast receiver in a vehicle. The method includes detecting an instruction to activate the digital radio broadcast receiver; accessing a software application at the vehicle in response to the instruction; and activating the digital radio broadcast receiver in the vehicle at the direction of the software application.

According to another embodiment of the invention, there is provided a method of controlling a digital radio broadcast receiver in a vehicle. The method includes presenting a vehicle owner in a vehicle an option to activate the digital radio broadcast receiver; receiving a selection at the vehicle to activate the digital radio broadcast receiver; wirelessly transmitting a computer-readable instruction representing the selection from a vehicle telematics unit to a remote facility; receiving a software application at the vehicle telematics unit from the remote facility; and activating the digital radio broadcast receiver in the vehicle using the software application.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below selectively enables a digital radio broadcast (DRB) receiver in a vehicle to receive digital radio broadcasts transmitted via terrestrial antenna or wireless carrier systems. When vehicles are assembled, vehicle manufacturers can include with each vehicle a DRB receiver that is capable of receiving DRBs. DRBs include audio in a digital format that is wirelessly transmitted via either a terrestrial radio tower/antenna or a central facility that sends audio as packetized data through a wireless carrier system. Currently, vehicles are assembled to include DRB receivers. However, in the past, each vehicle leaving manufacturing facilities may have included a DRB receiver that has been activated to receive DRB broadcasts. For each activated DRB receiver, the vehicle manufacturer may have to pay a licensing fee to the provider of DRB broadcasts received by the activated receiver. Yet manufacturers may not wish to shoulder the cost of paying these licensing fees—especially when it may be unclear how many vehicle owners want to receive DRBs.

Rather than activating every DRB receiver, vehicle manufacturers may want to more specifically determine which DRB receivers should be activated. In that sense, the vehicle manufacturer may equip every vehicle with a DRB receiver, but selectively activate those receivers based on different factors or input from a vehicle owner. This can be carried out in a number of ways. For example, the choice of whether or not the DRB is activated can be left to the vehicle owner. The vehicle owner can be offered a choice to activate the DRB receiver. If the vehicle owner chooses to do so, a central facility can be contacted in response to the choice and a software application that enables the DRB receiver can then be sent to the vehicle. As part of sending the software application to the vehicle, the central facility can receive payment from the vehicle owner either as a one-time fee or as a recurring stream of fees. In another example, the vehicle manufacturer can choose to activate DRB receivers on vehicles according to vehicle brand or vehicle models. For instance, Cadillac models may be delivered new to customers with a DRB receiver already activated while Chevrolet models may be delivered with DRB receivers placed in an inactive state. Alternatively, both Cadillac and Chevrolet models can be delivered new with deactivated DRB receivers and a central facility, such as a back-office facility or call center, can later activate the receivers remotely. The central facilities can wirelessly transmit a computer-readable command enabling a software application at the vehicle that activates the DRB receiver.

Figure 1:
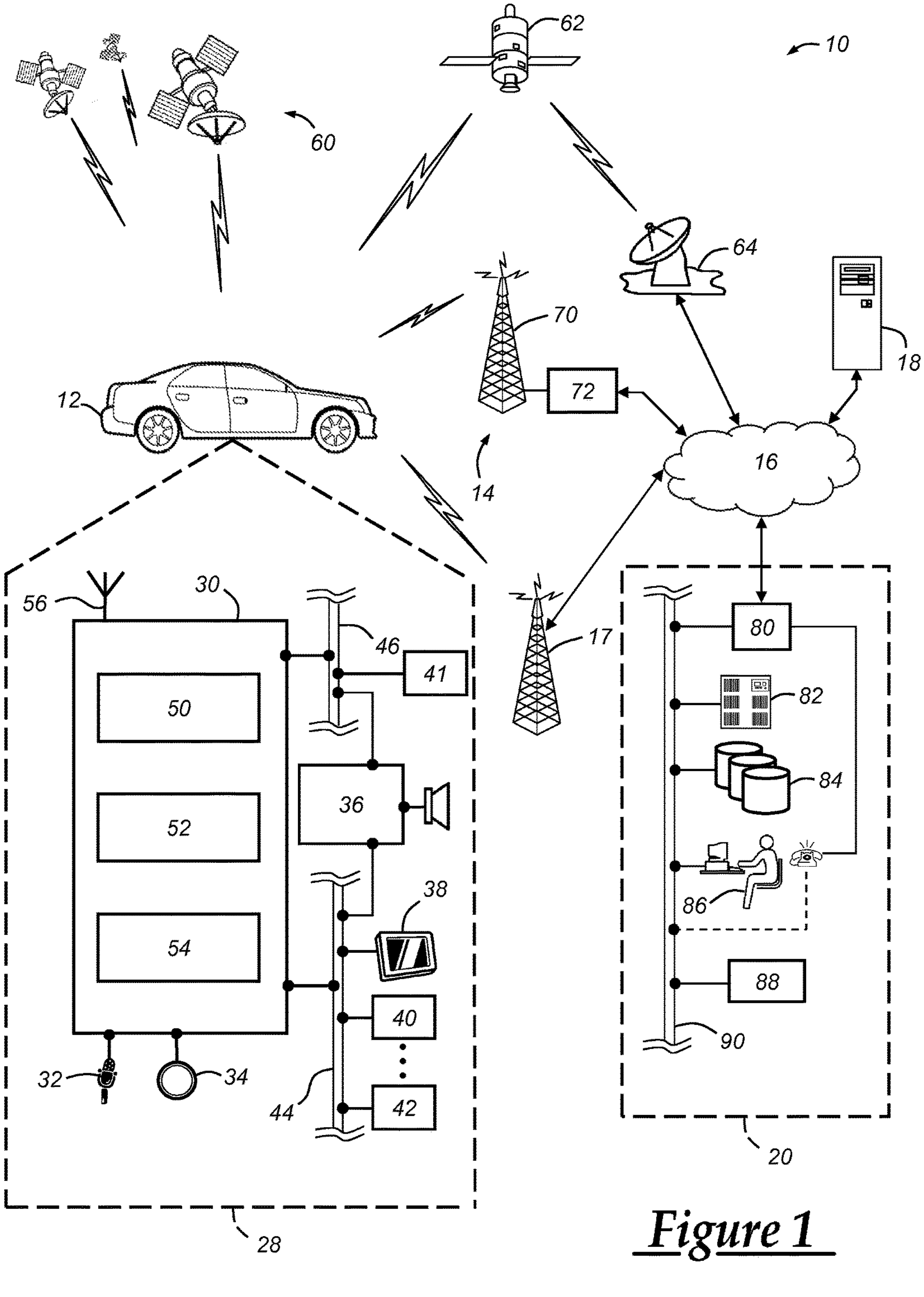
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as 4G LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where audio broadcasts, webpages, movies, television programs, videogames and/or other information is downloaded by an infotainment module 41 and is stored for current or later playback. The infotainment module 41 can include a digital signal processor that receives terrestrial audio broadcasts from terrestrial antenna or can receive audio broadcasts from the wireless carrier system 14 as packetized data via the vehicle telematics unit 30 and entertainment bus 46. The infotainment module 41 and other elements of the vehicle 12, such as the microphone 32, the pushbuttons or control inputs 34, the audio system 36, a visual display 38, and memory devices 54 can collectively be referred to as a center stack module (CSM). The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, circuit-switched digital technologies such as CDMA (e.g., CDMA2000, EVDO, or HSPA+) or GSM/GPRS, as well as non-circuit switched/all IP based cellular standards (3GPP 4G LTE). As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14. The land network 16 can also communicate with one or more terrestrial antennae 17 to supply digital radio broadcasts (DRBs) to the vehicle 12. A central facility, such as a computer 18 (discussed below) or a radio station (not shown), can generate the DRBs as packetized data and transmit the data to the antenna 17 where it can be converted to a digital audio signal and locally broadcast. Many modern radio stations are implemented using computer elements and these stations may be referenced to the computer 18 at various points in this disclosure. When the vehicle 12 is within range of the broadcast signal, the vehicle 12 can receive the signal via the antenna 56 and pass the signal to the infotainment module 41 via the entertainment bus 46. Examples of how the DRBs are transmitted or received include in-band on-channel radio (IBOC), such as NRSC-5 or NRSC-5-C. IBOC can include digital radio systems such as HD Radio™, FMeXtra, Digital Audio Broadcasting (DAB), Digital Radio Mondiale (DRM30 and DRM+ configurations), and Compatible AM-Digital (CAM-D), to name a few. DRBs can also include Internet radio provided by packet data over the cellular network. Examples of these services include Pandora, iHeart Radio, and Spotify.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
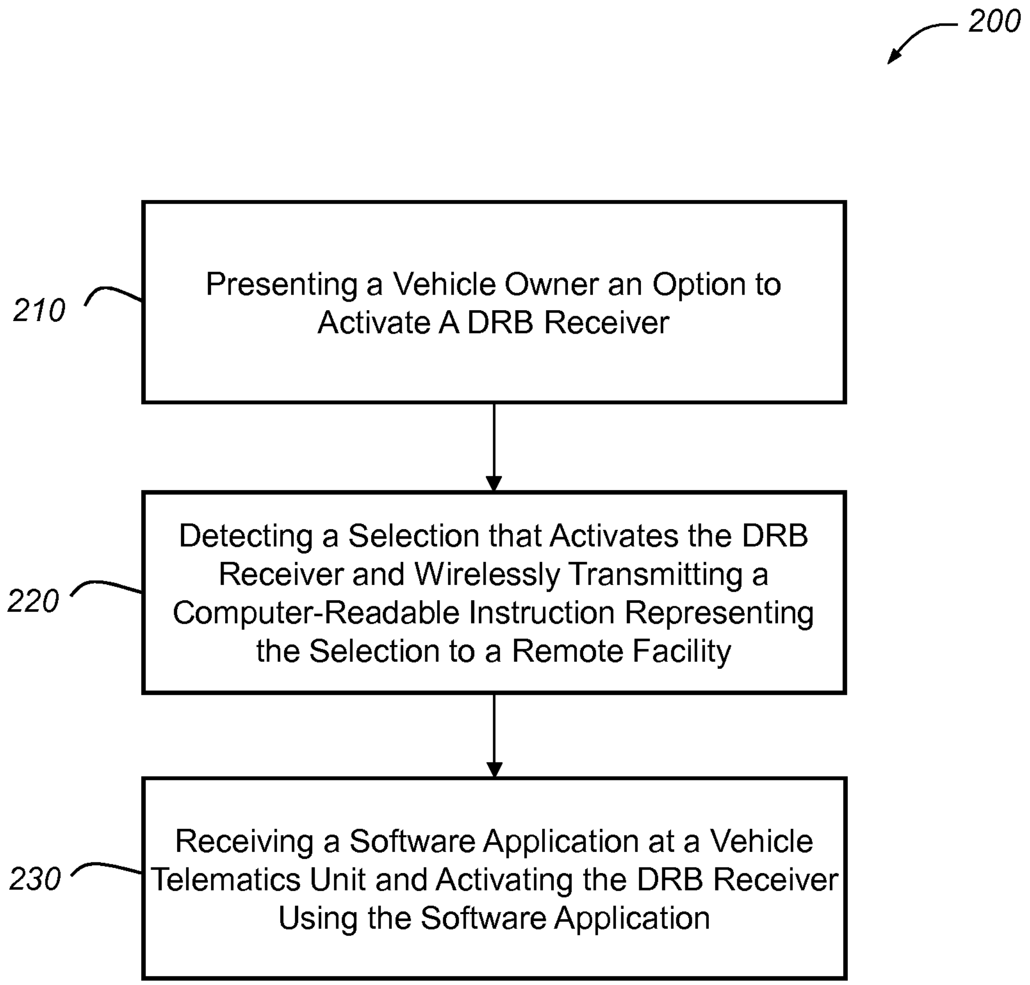
FIG. 2 is a flow chart depicting an embodiment of a method of controlling a digital radio broadcast (DRB) receiver in a vehicle.

Turning now to FIG. 2, there is shown a method 200 of controlling a digital radio broadcast (DRB) receiver in the vehicle 12. The method 200 begins at step 210 by presenting a vehicle owner an option to activate the DRB receiver. As discussed above, the DRB receiver can be incorporated into an infotainment module 41 shown in FIG. 1. In general, the DRB receiver can include a digital signal processor (DSP) capable of processing a digital audio signal that communicates the information in a DRB. The digital audio signal can originate from a variety of sources each of which have been represented by computer 18. In one example, the digital audio signal can originate from computers maintained at a radio station. The radio station can broadcast DRBs to the vehicle 12 via the terrestrial antenna 17 using IBOC techniques. In another example, a remote facility, such as a group of computer servers, can generate the content of the DRB, as a digital audio signal, packetize the signal, and communicate the data packets to the vehicle telematics unit 30 via the wireless carrier system 14, such as can be done with Internet radio. The vehicle telematics unit 30 can receive the packetized signal and send it to the infotainment module 41 where the signal can be processed using the DSP. The DRB can then be communicated to the vehicle in several ways.

To access the DRBs, the vehicle owner may be presented the option to activate the functionality of the infotainment module 41. This can occur in the vehicle 12 or at some other location outside of the vehicle 12, such as via a personal computer (PC) or a handheld wireless device (e.g., a smartphone or tablet). The vehicle owner can begin listening to music in the vehicle 12 and the display 38 can display a dimmed icon representing the deactivated capability of the infotainment module 41 to receive DRBs. If desired, the vehicle owner can touch the dimmed icon displayed that can begin the process of activating the ability of the infotainment module 41 to receive DRBs. In another example, the vehicle owner searches an "app store" that offers a plurality of software applications that are commonly downloaded onto handheld wireless devices. Such app stores exist for Apple™ devices and other handheld devices operating using the Android™ operating system. The vehicle owner can search the app store for a software application that enables the infotainment module 41 and the select the application to enable DRBs at a particular vehicle 12.

The vehicle owner can also identify the vehicle 12 using the infotainment module 41 to be enabled by supplying a vehicle identifier, such as a vehicle identification number (VIN), a mobile identification number (MIN), or a mobile dialed number (MDN), to name a few. It should be appreciated that the term "vehicle owner" can encompass not only a person who holds legal title to the vehicle or a vehicle lessee, but also anyone who has regular control or use of the vehicle 12, such as an employee or relative of the person or organization holding the legal title. Also, it is possible to activate the DRB receiver without input from the vehicle owner. For example, the call center 20 can wirelessly transmit a computer-readable instruction to the vehicle 12 instructing the vehicle telematics unit 30 to access a software application stored at the vehicle 12. The software application can be used to activate the DRB receiver. This will be discussed in more detail below. The method 200 proceeds to step 220.

At step 220, a selection is detected that activates the DRB receiver and a computer-readable instruction representing the selection is wirelessly transmitted to a remote facility.

After the vehicle owner has determined that DRB broadcasts are desired, he or she can select an option that conveys to the remote facility through the vehicle 12 or other computing device that a software application should be sent to the vehicle 12 to enable the DRB broadcasts. In one example, the vehicle owner can select an option to receive the DRB broadcasts using an input in the vehicle 12, such as the icon shown on display 38. The vehicle 12 detects the selection and wirelessly transmits a computer-readable command to the remote facility, such as the computer 18 or the call center 20, that can control sending the software application to the vehicle 12. The remote facility can receive the computer-readable command and select the software application for the vehicle 12. This can involve determining the identity of the vehicle 12 to receive the software via a vehicle identifier. The vehicle identifier can be included with the computer-readable command. In one implementation, the vehicle identifier can be obtained from memory at the vehicle 12 or it can be provided by the vehicle owner. The vehicle identifier can be used to associate the vehicle owner with an account that enables the vehicle owner to pay for the enabling of the DRB receiver. The method 200 proceeds to step 230.

At step 230, the software application is received at the vehicle telematics unit 30 and the DRB receiver is activated in the vehicle 12 using the software application. Broadly speaking, the software application can enable the receipt and playback of DRBs in the vehicle 12. When received, it can be stored at the vehicle 12 in various locations, such as in memory 54. The software application can be an Android™ application package file (APK) or other similar application programming interface (API). As noted above, the software application can be received from a remote facility, such as computer 18. In one embodiment, this can be a software repository maintained by a vehicle telematics subscription service. Or in another implementation, the software application can be received from the app store. The financial payment from the vehicle owner to DRB service providers can be coordinated by the app store, which in this description is represented in FIG. 1 as computer 18. The vehicle owner may have registered an account with the app store that enables the vehicle owner to pay for the software application enabling the DRB receiver in the vehicle 12. The method 200 ends.

Figure 3:
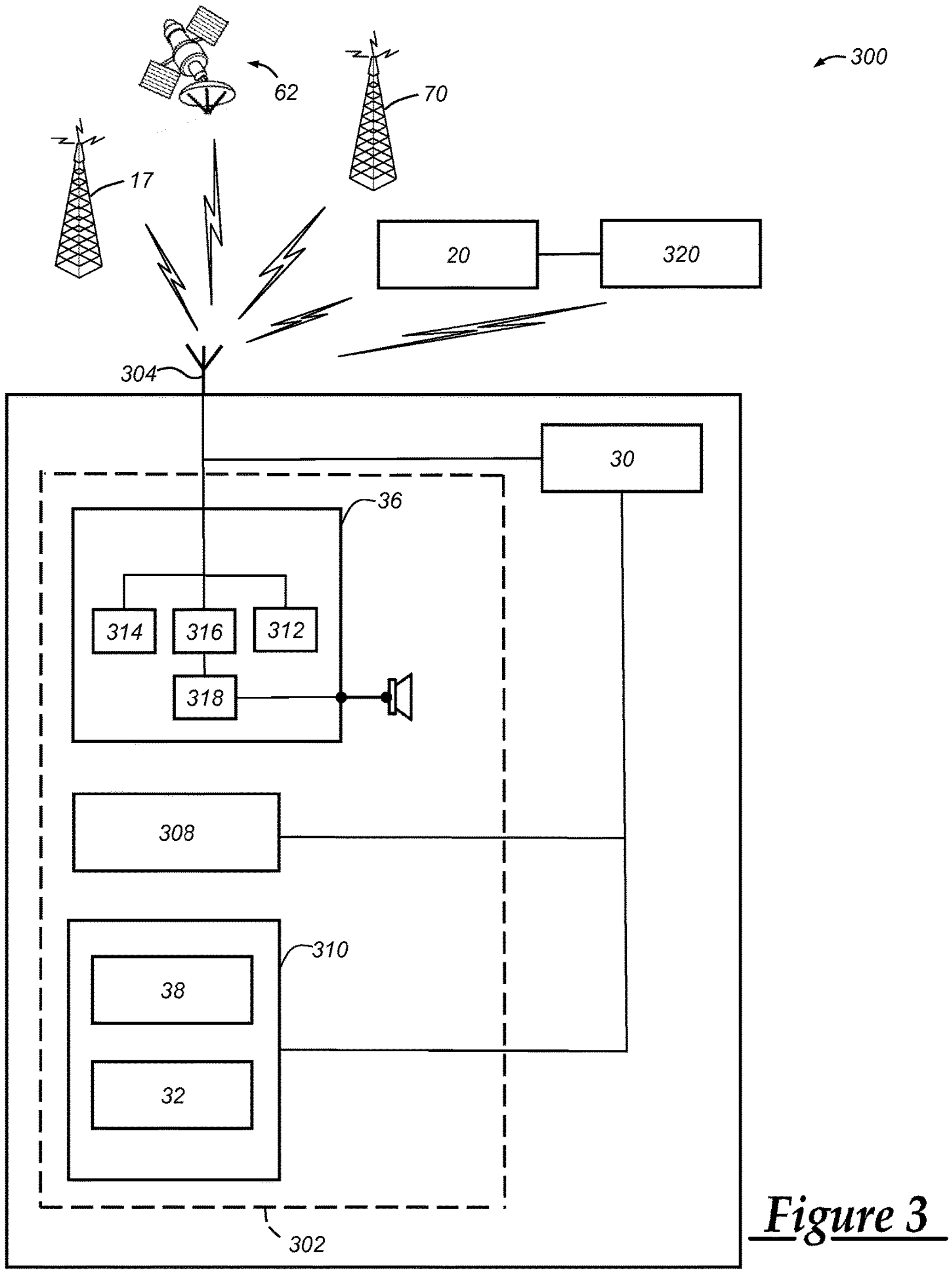
FIG. 3 is a block diagram depicting an embodiment of an operating environment in which a software application that activates the ability of a vehicle to receive a DRB can be received or activated.

Turning to FIG. 3, there is shown an operating environment 300 in which the software application that activates the ability of the vehicle 12 to receive DRBs can be received or activated. The operating environment 300 depicts the vehicle 12 having a portion of the vehicle electronics 28 and other elements described above with respect to FIG. 1 implemented as a center stack module (CSM) 302, the vehicle telematics unit 30, and one or more antennae 304. The vehicle 12 can use the CSM 302, the vehicle telematics unit 30, and antennae 304 to receive DRB broadcasts from the cell tower 70, terrestrial antenna 17, or communications satellites 62 as well as the software applications used to enable reception of those broadcasts. The CSM 302 can include the audio system 36 shown in FIG. 1, a software application management system 308, and a user interface 310. The audio system 36 can include a software-defined radio (SDR) module 312 and, optionally, an AM/FM tuner 314 and/or a satellite radio receiver 316. The SDR module 312 can use a software application, either pre-installed in the vehicle 12 during assembly or received later from a remote source, to decode the DRB broadcasts received at the vehicle 12.

Generally speaking, the SDR module 312 can receive a digital signal carrying data that represents audio content and convert that data into audible sound using a software application. The SDR module 312 can include a microprocessor that receives the digital signal and processes it using the software application that enables decoding the signal. In some implementations, the vehicle 12 may lack the software application used to decode the digital signal carrying the data representing the audio content. However, in other implementations the software application can be present in the SDR module 312 yet not be functional. The functionality of the software application can later be activated using a particular code or key that the application recognizes and enables the functionality of the SDR module 312. After decoding the digital signal, the SDR module 312 can output the audio content of the DRB broadcast to an amplifier 318 before playing the output in the vehicle 12 using a speaker.

The software applications or activation keys for enabling the software applications can be obtained at the vehicle 12 from an application or "app" store 320 or the call center 20. A vehicle occupant can request the software application that enables the SDR module 312 from either the app store 320 or the call center 20. The vehicle telematics unit 30 can wirelessly transmit a request directly to the app store 320, which can respond by wirelessly transmitting the appropriate software application directly to the vehicle telematics unit 30. This can be initiated by the vehicle occupant at the vehicle 12 using a touch-screen graphical user interface (GUI), such as display 38, or verbally through the microphone 32. The vehicle occupant can select an icon displayed on the GUI or verbally say a command that initiates a request for the software application. The vehicle occupant or even the vehicle 12 itself can be associated with an account at the app store 320 that links a payment stream or payment mechanism to the provision of the software application. The vehicle owner can then provide payment for the requested software application received at the vehicle 12. Besides contacting the app store 320, a vehicle occupant can also obtain the software application by contacting the call center 20. The software application appropriate for the vehicle 12 can be located either at the call center 20 or obtained from the app store 312 and wirelessly transmitted to the vehicle 12. The software application can be identified by year and model number of the vehicle 12. The call center 20 can also provide updates for the software application to the vehicle telematics unit 30 periodically or when those updates become available.

In other implementations, the software application may already be installed on the vehicle 12 but not functional without a code or a key that unlocks the software application to enable its functionality. In that case, the vehicle occupant can initiate a request for the code or key in a similar manner as is done to request the software application as described above. Rather than receiving the software package, the vehicle telematics unit 30 can receive the code or key that activates or enables the software application stored at the vehicle 12. The software application, keys, or codes can be managed by the software application management system 308 comprising non-volatile memory capable of storing electronic data.

Figure 4:
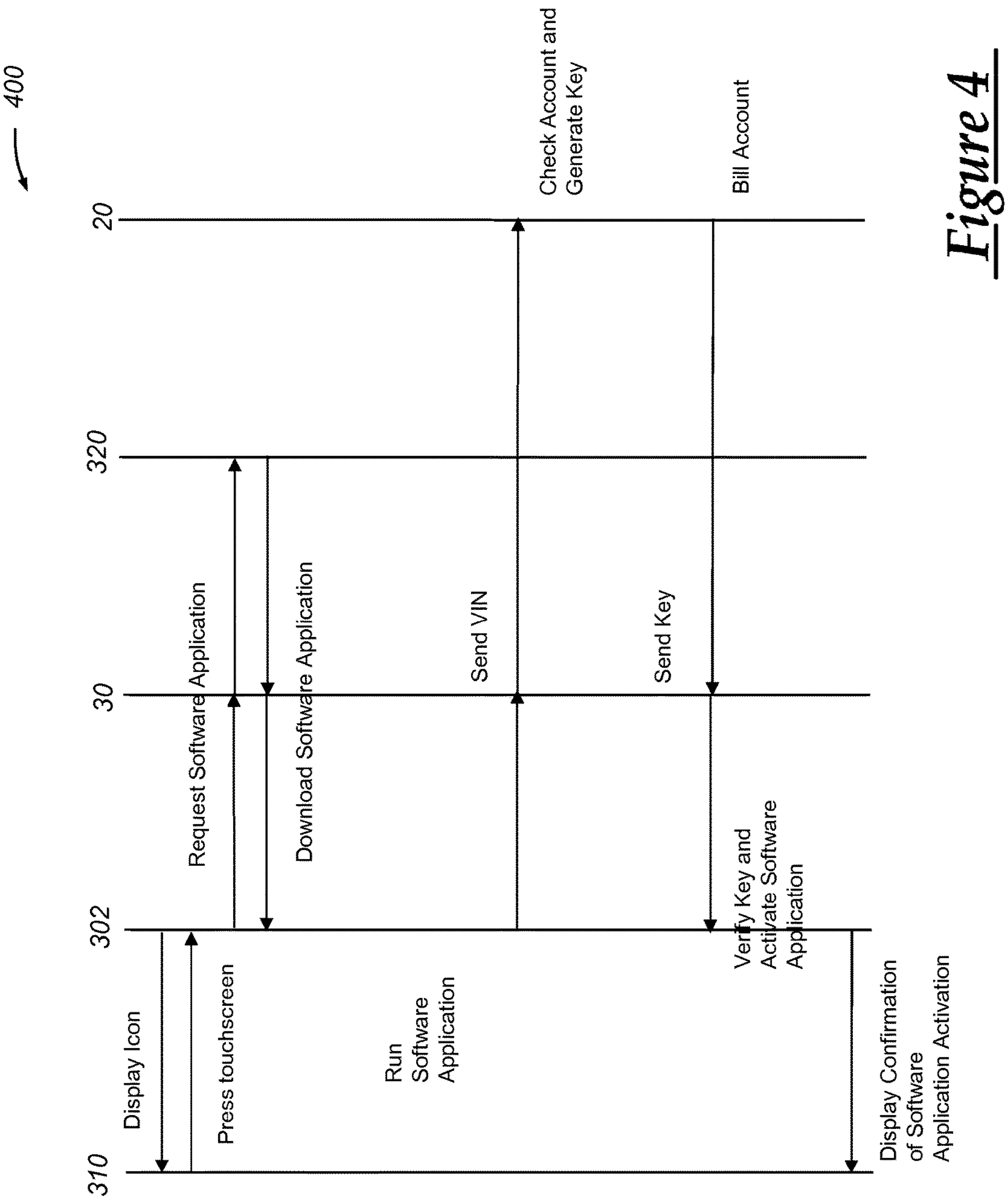
FIG. 4 is a communication flow depicting an embodiment of a method of obtaining and activating a software application in a vehicle.

Turning to FIG. 4, a method 400 is shown of obtaining and activating the software application in the vehicle 12 using the elements described above with regard to FIGS. 2-3. The method 400 is depicted as an exemplary flow between the user interface 310, the CSM 302, the vehicle telematics unit 30, the app store 320, and a back office entity, such as the call center 20. The user interface 310 can display an icon on the user interface 310 that represents the software application enabling the DRB receiver, such as the SDR 312. As noted above, this icon can be shown as a darkened image on the display 38 when viewed relative to other icons or text thereby indicating that the functionality relating to the DRB receiver is not presently activated. A vehicle occupant can touch or select the darkened icon to request the software package that can enable the functionality of the DRB receiver. This selection can direct the CSM 302 to initiate a request for the software application from the vehicle telematics unit 30 to the app store 320. The app store 320 can respond by wirelessly transmitting the software package to the vehicle telematics unit 30. Once received, the vehicle telematics unit 30 can transmit the software application to the CSM 302 where the application is installed and executed.

To activate the software application, the vehicle telematics unit 30 can send a vehicle identifier, such as a vehicle identification number (VIN), to the call center 20, which can verify that the software application should be activated. The call center 20 can verify the software application in a variety of ways. For instance, the call center 20 can determine whether a method of payment is associated with the application so that the vehicle occupant or vehicle owner can pay for the software application. If such an account exists and is in good standing, the call center 20 can obtain payment from that account and generate a code or key that activates the software application. The code/key can then be transmitted to the vehicle telematics unit 30. The code or key can be implemented in a variety of ways, such as a hash function of some portion of the vehicle identifier. Once received, the vehicle telematics unit 30 can verify the code or key and use it to enable the software application that activates the DRB receiver or SDR 312. After enabling the software application, the CSM 302 can generate an acknowledgment that confirms the activation of the DRB receiver on the display 38 of the user interface 310.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling a digital radio broadcast receiver in a vehicle, comprising the steps of:

(a) detecting an instruction to activate the digital radio broadcast receiver;

(b) transmitting a vehicle identifier to a central facility in response to step (a);

(c) receiving a software application or a code unlocking a software application at the vehicle;

(d) accessing the software application, wherein the software application enables audio that is received as packet data transmissions over a wireless carrier system comprising a cellular telephone system or that is received as broadcasted in-band on-channel (IBOC) radio; and (e) activating the digital radio broadcast receiver in the vehicle at the direction of the software application.

2. The method of claim 1, wherein the software application includes a vehicle identifier.

3. The method of claim 1, further comprising the step of:

obtaining a vehicle identifier from the vehicle at the direction of the software application.

4. The method of claim 3, further comprising the steps of:

generating a code from the vehicle identifier;

transmitting the code from the remote facility to the vehicle; and activating the software application with the transmitted code.

5. The method of claim 1, further comprising the step of associating the activated digital radio broadcast receiver in the vehicle with an account of a vehicle owner.

6. A method of controlling a digital radio broadcast receiver in a vehicle, comprising the steps of:

(a) presenting a vehicle owner in a vehicle an option to activate the digital radio broadcast receiver;

(b) receiving a selection at the vehicle to activate the digital radio broadcast receiver;

(c) wirelessly transmitting a computer-readable instruction representing the selection from a vehicle telematics unit to a remote facility;

(d) receiving a software application at the vehicle telematics unit from the remote facility; and (e) activating the digital radio broadcast receiver in the vehicle using the software application.

7. The method of claim 6, wherein the digital radio broadcast receiver receives audio transmitted as packetized data via a data connection with a wireless carrier system.

8. The method of claim 6, wherein the digital radio broadcast receiver receives audio transmitted via terrestrial antenna.

9. The method of claim 8, wherein the audio transmitted via terrestrial antenna is broadcast as in-band on-channel (IBOC) radio.

10. The method of claim 6, wherein the software application includes a vehicle identifier.

11. The method of claim 6, further comprising the steps of:

obtaining a vehicle identifier from the vehicle at the direction of the software application; and transmitting the vehicle identifier from the vehicle to the remote facility.

12. The method of claim 11, further comprising the steps of:

generating a code from the vehicle identifier;

transmitting the code from the remote facility to the vehicle; and activating the software application with the transmitted code.

13. The method of claim 6, further comprising the step of associating the activated digital radio broadcast receiver in the vehicle with an account of the vehicle owner.

14. The method of claim 6, wherein the software application is an Android™ application package file.

* * * * *